United States Patent
Fechtel

(10) Patent No.: US 8,068,567 B2
(45) Date of Patent: Nov. 29, 2011

(54) PHASE AND FREQUENCY CONTROL OF AN ODFM RECEIVER BY MEANS OF PILOT PHASE-VALUE ESTIMATION

(75) Inventor: Stefan Fechtel, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 1148 days.

(21) Appl. No.: 11/556,345

(22) Filed: Nov. 3, 2006

(65) Prior Publication Data
US 2007/0110175 A1    May 17, 2007

Related U.S. Application Data

(63) Continuation of application No. PCT/DE2005/000625, filed on Apr. 8, 2005.

(30) Foreign Application Priority Data

May 4, 2004   (DE) .................. 10 2004 021 860

(51) Int. Cl.
*H04L 27/06* (2006.01)
*H04L 27/28* (2006.01)
(52) U.S. Cl. .................. 375/344; 375/260
(58) Field of Classification Search .......... 375/326, 375/341, 260, 324, 344; 370/203, 210
See application file for complete search history.

(56) References Cited

U.S. PATENT DOCUMENTS

| | | | | |
|---|---|---|---|---|
| 5,268,647 A | 12/1993 | Ichiyoshi | | 329/208 |
| 5,838,734 A * | 11/1998 | Wright | | 375/326 |
| 6,720,824 B2 * | 4/2004 | Hyakudai et al. | | 375/326 |
| 7,009,932 B2 | 3/2006 | Matheus et al. | | 370/208 |
| 7,173,982 B1 | 2/2007 | Yang et al. | | 375/329 |
| 7,173,990 B2 | 2/2007 | Kim et al. | | 375/347 |
| 7,184,495 B2 | 2/2007 | Thomson et al. | | 375/340 |
| 7,333,548 B2 * | 2/2008 | Chen | | 375/260 |
| 2003/0053564 A1 * | 3/2003 | Kim et al. | | 375/326 |
| 2003/0063678 A1 | 4/2003 | Crawford | | 375/260 |
| 2004/0071234 A1 * | 4/2004 | Li | | 375/341 |
| 2006/0109780 A1 * | 5/2006 | Fechtel | | 370/203 |

FOREIGN PATENT DOCUMENTS

| | | |
|---|---|---|
| DE | 199 48 899 A1 | 4/2001 |
| DE | 692 31 879 T2 | 12/2001 |
| EP | 1 580 949 A1 | 9/2005 |
| WO | 98/32267 A1 | 7/1998 |

OTHER PUBLICATIONS

Liu et al. "Parameter Estimation and Error Reduction for OFDM-Based WLANs" IEEE Transactions on Mobile Computing, vol. 3, No. 2 (pp. 152-163), Apr. 2004. International Search Report for International Application No. PCT/DE2005/000625 (7 pagess), Aug. 4, 2005.
International Preliminary Report on Patentability for International Application No. PCT/DE2005/000625 (18 pages), Mar. 28, 2006.

* cited by examiner

*Primary Examiner* — Betsy Deppe
(74) *Attorney, Agent, or Firm* — Dicke, Billig & Czaja, PLLC

(57) ABSTRACT

A common phase value of pilot subcarriers of a received data symbol (n) is estimated and used for correcting the phase of all subcarriers of the data symbol, wherein, with a time-variant frequency of the local oscillator (VCO), the estimated noisy phase values ($\Psi_n$) are used directly for the phase and frequency correction, whereas with a time-invariant frequency after the VCO, a corrected phase value ($\hat{\phi}_n$) is determined from the estimated phase values of the current data symbol ($\Psi_n$) and earlier data symbols ($\Psi_m$) in a linear FIR filter arrangement (17-20) and is used for the phase correction.

25 Claims, 5 Drawing Sheets

PHASE AND FREQUENCY CONTROL OF AN ODFM RECEIVER BY MEANS OF PILOT PHASE-VALUE ESTIMATION

CROSS-REFERENCE TO RELATED APPLICATION

This application is a continuation of co-pending International Application No. PCT/DE2005/000625 filed Apr. 8, 2005, which designates the United States, and claims priority to German application number DE 10 2004 021 860.9 filed May 4, 2004.

TECHNICAL FIELD

The present invention relates to a method and to a device for controlling a receiver of a multi-carrier system in response to the frequency characteristic of a local oscillator used for downconverting the received signal.

BACKGROUND

The invention is in the field of digital signal processing for multi-carrier systems, particularly OFDM (orthogonal frequency division multiplex) transmission systems. In these, the transmission band is divided into a number N of subcarriers and each subcarrier is occupied with a modulation (PSK, QAM). In the transmitter, the vector of all N modulated subcarriers of an OFDM symbol present in the frequency domain is transformed into the time domain by means of a fast Fourier transform (FFT). In the receiver, the N time signal samples of an OFDM symbol are transformed back into the frequency domain by means of an FFT and demodulated there.

Whereas continuous OFDM data streams are transmitted in broadcasting (DAB, DVB-T), the transmission in the systems forming the basis here (e.g. WLAN) takes place by means of OFDM data packets of variable length which arrive at the receiver at unknown or inaccurately known times. The receiver must, therefore, first perform an initial synchronization in which, among other things, the phase and carrier frequency error must be found (acquisition) and continuously corrected (tracking).

In the receiver front end, a local oscillator is usually used for downconverting the received signal to an intermediate frequency or directly into the baseband. The local oscillator is usually implemented as VCO (voltage controlled oscillator) and is used for the transmitting and receiving operation. Problems are presented by switching-on or switching-over processes of transmitting and receiving operation (TX-RX or RX-TX) and corresponding switching processes at the VCO (or its load) which can result in considerable settling of the carrier frequency and phase (VCO glitch or VCO deviation) to the stable final value. These transients influence not only the synchronization preamble of a data packet but frequently continue far into the area of the payload. FIG. 1 shows by way of example the variation with time of the VCO frequency after a switching process (upper part) and the initial part of an OFDM burst (lower part). The OFDM burst has a so-called PLCP preamble with a length of 16 μs, known from the IEEE 802.11a standard. A first section of the PLCP preamble with a length of 8 μs is subdivided into ten short symbols, and a second section with a length of 8 μs consists of a guard interval and two OFDM symbols C1 and C2 which are used for channel estimation. These are followed by the payload symbols. In FIG. 1, it can be seen that the VCO transient reaches far into the area of the payload symbols. On WLAN cards available on the market (also IFX boards), frequency shifts of up to 16 kHz over up to 10 OFDM payload symbols were measured.

In OFDM demodulation, a VCO deviation in the frequency domain (post FFT) manifests itself as running away of the phase (common phase, CP). More detailed investigations show that this disturbs the payload to a much greater extent than the preamble synchronization which supplies good starting values for frequency and phases in spite of the VCO deviation. Without fast frequency/phase correction in the frequency domain (post FFT) during the first OFDM payload symbols (SIGNAL S followed by DATA D1, D2, . . . in WLAN), the phase coherence can be lost completely. In addition, considerable frequency shift leads to loss of the orthogonality and thus to intercarrier interference (ICI) of the received subcarriers. This effect can be combated effectively only in the time domain (pre FFT).

For the frequency/phase synchronization, pilot phase estimation (common phase estimation, CPE) and compensation (common phase correction, CPC), decision directed (DD) phase estimation and compensation and mixtures of both methods have previously been used. The pilot-based methods, i.e. methods based on the pilot subcarriers, are rugged and, above all, fast since they do not produce any decision errors and the phase errors can be corrected without delay in the same OFDM symbol. However, they suffer from higher noise effects since only a few pilots are available for the phase estimation (WLAN: K=4 pilots compared with 48 data carriers). The methods operating with decision-directed frequency/phase tracking, i.e. method based on the data subcarriers, are characterized by better estimating accuracy but, due to the decoding and remodulation delay (some OFDM symbols), are too slow to follow fast VCO phase changes. Such methods, which contain both pilot and decision-directed elements allow a certain tradeoff between ruggedness, speed and estimating accuracy, but are very complex.

SUMMARY

A method and a device for controlling a receiver of a multi-carrier system in response to the frequency characteristic of the local oscillator, by means of which the above-mentioned characteristics of rugged and fast tracking can be joined in a suitable manner to the characteristics of high estimating accuracy. In an embodiment, a method for controlling a receiver of a multi-carrier system in response to the frequency characteristic of a local oscillator used for downconverting the received signal, may comprise the steps of a) estimating and using a common phase value of subcarriers of a received data symbol for correcting the phase of all subcarriers of the data symbol, wherein b) with a time-variant frequency of the local oscillator, a first method is used for phase estimation and acquisition of a phase value to be used for the phase correction, wherein the first method operates on the basis of pilot subcarriers, and c) with a time-invariant frequency of the local oscillator, a second method is used for phase estimation and acquisition of a phase value to be used for the phase correction, wherein the second method operates on the basis of data subcarriers, wherein for a predetermined period after the local oscillator has been switched on or over, method step b) is performed and then method step c) is performed.

BRIEF DESCRIPTION OF THE DRAWINGS

In the text which follows, the invention will be explained in greater detail with reference to exemplary embodiments and in conjunction with the figures of the drawing, in which.

DETAILED DESCRIPTION

Figure 1:
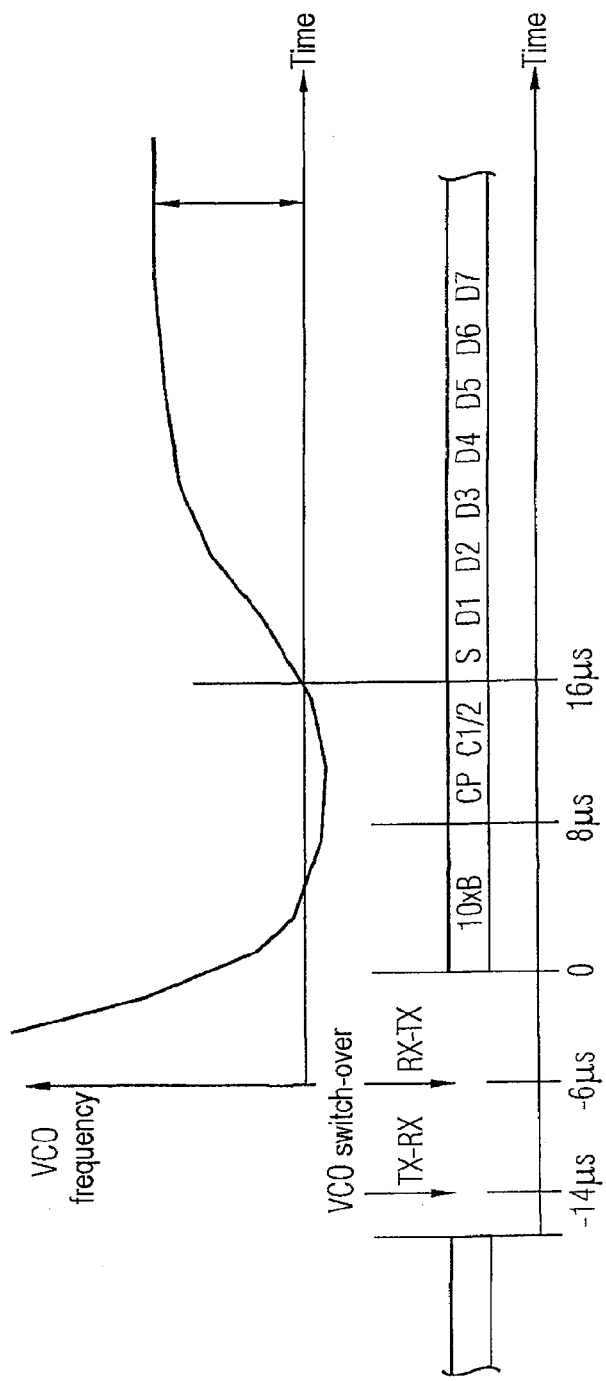
FIG. 1 shows the time response of the local oscillator (top) and the structure of a WLAN burst.

The frequency characteristic of the local oscillator basically assumes two different states, namely a first state in which the frequency is variable with time and a second state in which the frequency is constant with time. According to an embodiment, a common phase deviation of certain subcarriers of the received data symbol, also called phase value in the text which follows, is estimated. According to an embodiment, two different methods can be provided to be applied according to the two different states of the local oscillator in order to obtain a phase value to be used for the phase correction.

It may, thus, be possible to adapt the type of acquisition of the phase value to be used for the phase correction in a flexible manner to the state of the local oscillator and thus to optimize it. The main factor in the two different states of the oscillator is to optimize different variables and correspondingly to select the method of phase estimation. In the first, time-dependent state of the local oscillator, it is more a matter of the speed of the method so that it can also follow fast changes in the frequency. In the second, time-invariant state of the local oscillator, in contrast, the speed does not play a role so that more importance can be placed on the estimating accuracy.

According to an embodiment, in a method for controlling a receiver of a multi-carrier system in response to the frequency characteristic of a local oscillator used for downconverting the received signal, a) a common phase value of subcarriers of a received data symbol is estimated and used for correcting the phase of all subcarriers of the data symbol, wherein b) with a time-variant frequency of the local oscillator, a first method is used for phase estimation and acquisition of a phase value to be used for the phase correction, and c) with a time-invariant frequency of the local oscillator, a second method is used for phase estimation and acquisition of a phase value to be used for the phase correction.

According to an embodiment, a received OFDM data system is initially present in the time domain and is subjected to a Fourier transform in order to obtain the subcarriers. According to an embodiment, the subcarriers $z_{k,n}$ can be formed by $$z_{k,n} = e^{j\phi_n} \cdot c_k \cdot a_{k,n} + n_{k,n} \quad (1)$$

where $\phi_n$ is the common phase value of the subcarriers, $c_k$ is the channel gain or the channel coefficient, $a_{k,n}$ is the modulation symbol (BPSK or QAM) and $n_{k,n}$ are noise contributions, where k is the index of the subcarriers and n is the index of the data symbols.

According to an embodiment, the first and the second method have in common that a common phase value of subcarriers of a received data symbol is estimated and used for the phase correction. For the rest, however, the two methods differ from one another either in the type of estimation of the common phase value and/or the later evaluation, i.e. the acquisition of the phase value to be used for the phase correction to be performed.

According to an embodiment, still to be specified in greater detail below, both methods initially may perform the estimation of the current common phase value in the same manner, particularly in that they estimate the common phase value of the pilot subcarriers of a received data symbol and use it for phase correction. However, they differ in that in the first method, according to method step b), the estimated phase value of the current data symbol is used directly for the phase correction whereas, in the second method according to method step c), in addition to the estimated phase value of the current data symbol, estimated phase values from earlier data symbols are also used and from the current and the earlier phase values a corrected phase value is determined and is used for the phase correction.

According to an embodiment, in particular, when the pilot subcarriers are used as subcarriers in method step a), the phase value $\Psi_n$ can be estimated with the pilot symbols $a_{k,n}$ known at the receiver, as follows:

$$u_{k,n} = a_{k,n}^* \cdot z_{k,n} \quad (2)$$

$$P_n = \sum_{k=1}^{4} c_{k,n}^* \cdot u_{k,n} \quad (3)$$

$$\Psi_n = \arg(p_n) \quad (4)$$

where $z_{k,n}$ are the pilot subcarriers of a data symbol, obtained after the Fourier transform, $a_{k,n}$ are the pilot symbols, $u_{k,n}$ are the demodulated pilot subcarriers and $c_{k,n}$ are the channel coefficients or channel gains. According to an embodiment, in this context, the CORDIC algorithm, known in the prior art, can be used in equation (4).

According to an embodiment, in the first method according to method step b), this phase value $\Psi_n$ determined as above is used directly for the phase correction in accordance with the preferred embodiment.

According to an embodiment, in the second method according to method step c), however, not only the phase value $\Psi_n$ but additionally the phase values $\Psi_m$ determined from earlier data symbols are then also used for calculating a corrected phase value $\hat{\phi}$. In this process, the estimated phase values of all past data symbols are preferably taken into consideration which have occurred since the assumed or determined constancy of the frequency of the local oscillator. With a constant frequency of the local oscillator, the phase values are nominally arranged on a straight line. Thus, a straight line can be placed through the estimated phase values which approximates the estimated phase values to the best possible extent and the corrected phase value is given by the point on the straight line at the place of the current data symbol. Mathematically, this leads to the following equation:

$$\hat{\varphi}_n = \sum_{m=M+1}^{n} w_{n,m} \cdot \Psi_m = \sum_{m'=1}^{n'} w_{n',m'} \cdot \Psi_{M+m'} \quad n \geq M+1 \quad (5)$$

where $$w_{n',m'} = \frac{2(3m' - (n'+1))}{n'(n'+1)} \quad (6)$$

According to an embodiment, this equation can be calculated either in software (in a digital signal processor) or implemented in hardware by a linear FIR filter of length n'=n−M, where the quantities $w_{n',m'}$ are the FIR filter coefficients.

According to an embodiment, using a number of phase values for determining a corrected phase value in method step c) reduces the noise and increases the estimating accuracy. According to an embodiment, it is accepted that the speed in the phase estimation and the subsequent phase correction is reduced by the higher mathematical complexity.

As mentioned, according to an embodiment, it may be provided as described above that the pilot subcarriers are used for estimating the phase values in the first and second method.

According to an embodiment, however, the deciding factor is only that the second method achieves a higher estimating accuracy than the first method and a loss in speed is accepted. According to an embodiment, as an alternative, it can thus also be provided that the first method operates on the basis of the pilot subcarriers and the second method operates on the basis of the data subcarriers. According to an embodiment, compared with the pilot-based estimation, the estimating accuracy can also be increased by the number of available data subcarriers (K=48). According to an embodiment, it is then also sufficient if only one phase value is estimated and used for the phase correction.

In particular, the method according to an embodiment can be applied to the problems described initially with reference to FIG. 1, in which, in a first phase, after a switching-on or switching-over process of the local oscillator, the frequency delivered by it is variable in time and in a second phase following the first phase, the frequency of the local oscillator is constant in time. According to an embodiment, during the first phase, the first method according to method step b) is then performed and during the second phase, the second method according to method step c) is performed.

The duration of the first phase is approximately known from measurements. It can be predetermined for the performance of the method according to an embodiment, independently of the actual achievement of the time-constancy of the output frequency of the local oscillator. According to an embodiment, in particular, it can be predetermined as a number M of data symbols. However, according to an embodiment, it should be possible to adapt or reprogram the duration of the first phase, in particular to program a new value for the number M.

The latter shows that the application of the second method for phase estimation with a frequency which is constant in time, provided according to an embodiment, does not necessarily have to be understood to mean that the frequency constancy has actually already occurred. According to an embodiment, it can also be provided that the second method is already applied when the frequency constancy has actually not yet occurred but an internally predetermined value for the number M of data symbols of the first phase forces the transition to the second method.

However, according to an embodiment, it can also be provided that the duration of the first phase is not predetermined internally but is automatically ended when it is found that the estimated phase values assume a linear variation with a predetermined approximation. Thus, it is found internally in automated manner that the output frequency of the local oscillator has reached a constant state and the transition to the second method only occurs at that time.

The method according to an embodiment is used for determining a phase value for performing a phase correction and performing a phase correction of all subcarriers on the basis of this phase value. According to an embodiment, during the phase correction, the subcarriers $z_{k,n}$ are corrected in accordance with $$z_{k,n}^{(corr)} = e^{-i(\Psi_n, \varphi_n)} \cdot z_{k,n} \quad (7)$$

where k is again the index of the subcarriers and n is the index of the data symbols.

In a further embodiment, a frequency correction of the next data symbol following can be performed on the basis of the phase value to be used for the phase correction. In this process, a frequency offset is determined by comparing the phase value with a phase value determined earlier, and the I/Q values of the data symbol are corrected by the frequency offset determined. This variant of the embodiment is preferably switched off when the output frequency of the local oscillator has reached a constant level.

According to yet another embodiment, in a device for carrying out the method, which has a local oscillator for downconverting the received signal, a phase estimator has an input for inputting subcarrier data values and a first output for outputting estimated phase values and a phase corrector having a first input for inputting the subcarrier data values and a second input, connected to the first output of the phase estimator, for inputting the estimated phase values.

In particular, according to an embodiment, the device may have a Fourier transformer with an input for supplying the downconverted received signal and an output, connected to the input of the phase estimator and the first input of the phase corrector, for transmitting the subcarrier data values.

In another embodiment, a second output of the phase estimator can be connected to an input of a frequency corrector, the output of which is connected to an input of a numerically controlled oscillator, the output of which is connected to an input of a multiplier.

In a further embodiment, the phase estimator can be designed for phase estimation on the basis of the pilot subcarriers and has a first multiplier for multiplying the pilot subcarriers by the conjugate-complex pilot symbols, which delivers demodulated pilot subcarriers at its output, a second multiplier for multiplying the demodulated pilot subcarriers by the conjugate-complex channel coefficients, an accumulator which is connected to the second multiplier and which accumulates the output values delivered by the second multiplier and a CORDIC unit which determines the phase value from the values delivered by the accumulator by means of the CORDIC algorithm.

In a further embodiment, the phase estimator additionally may have an FIR filter, which contains a shift register, the register positions of which can be alternately connected to an output of the shift register, a multiplier, the first input of which is connected to the output of the shift register, an FIR coefficient table, the output of which is connected to the second input of the multiplier, and an accumulator, the input of which is connected to the output of the multiplier, wherein the FIR filter can be alternately switched between the output of the CORDIC unit and the output of the phase estimator.

In a further embodiment, the phase corrector may have a sin/cos table which is supplied with the estimated phase value at its input and which outputs the complex quantity $e^{-i(\Psi_{m,n})}$ at its output, and a multiplier which is supplied with the subcarrier data values at its first input and the complex quantity $e^{i(\Psi_{m,n})}$ at its second input and which outputs the phase-corrected subcarrier data values at its output.

In a further embodiment, the frequency corrector may have an adding element, the first input of which is connected to the input of the frequency corrector and the second input of which is connected to the input of the frequency corrector via a delay element, and which has a sign changer, and the output of which provides a phase difference, the output of the adding element being connected to the input of the numerically controlled oscillator.

Figure 2:
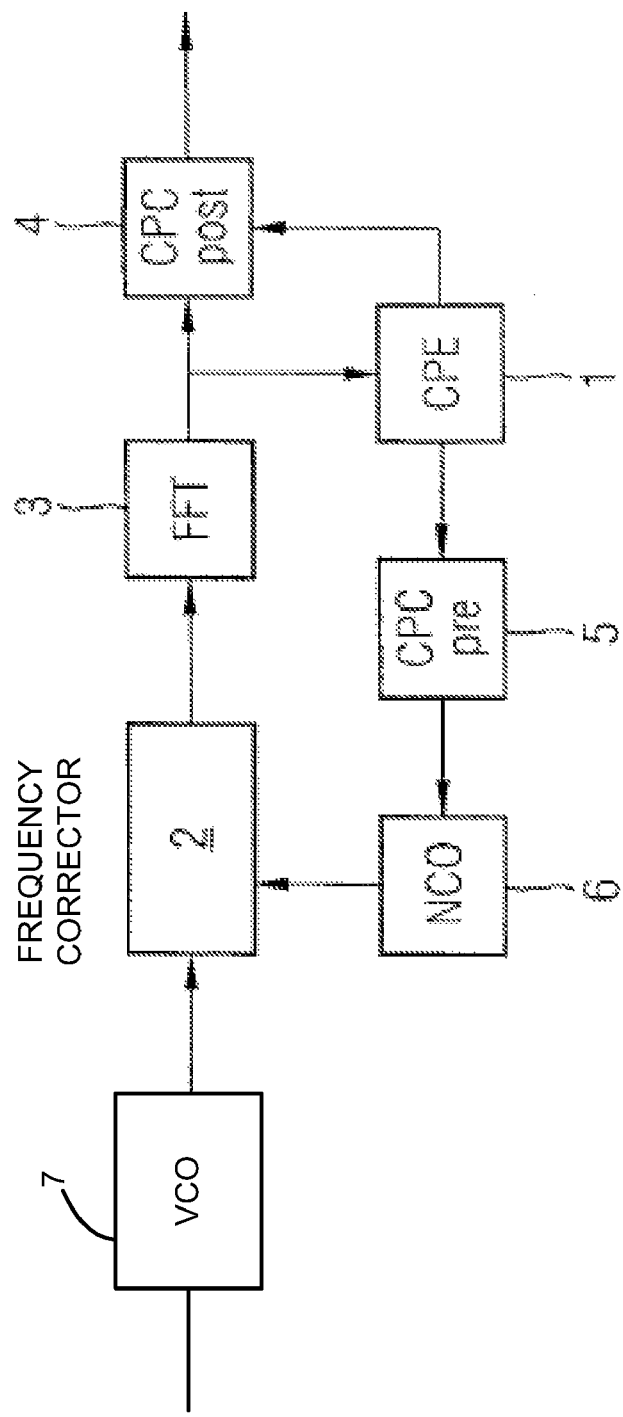
FIG. 2 shows a block diagram representation of an exemplary embodiment of a device for carrying out the method according to the invention.

FIG. 2 shows a block diagram of a device according to an embodiment which can be contained, for example, in an OFDM receiver. The received signal is downconverted to an intermediate frequency (or directly into the baseband) by means of a voltage-controlled oscillator VCO 7. In the frequency corrector 2, the signal is mixed into the baseband and, at the same time, a frequency correction is performed as will still be shown. The samples present in the time domain are subjected to a Fourier transform in a Fourier transformer 3 so that corresponding subcarrier data values are delivered at the output of the Fourier transformer 3. As is known, four of the 52 subcarriers provided in the IEEE 802.11 standard are arranged as so-called pilot subcarriers. These pilot subcarriers are delivered to a phase estimator 1 (CPE, Common Phase Estimation) in which the common phase value of the pilot subcarriers is to be estimated.

The phase estimator 1 transmits the estimated phase value both to a phase corrector 4 (post CPC) and to a frequency corrector 5 (pre CPC). In the phase corrector 4, a phase correction of the current OFDM symbol is performed in the frequency domain by multiplying all subcarriers with a correction phasor. In the frequency corrector 5, a signal is generated for the frequency correction of the next OFDM symbol following in the time domain. During the time-dependent state of the VCO oscillator, a frequency offset is estimated by comparing two successive phase estimation values in the frequency corrector 5. A phase increment value corresponding to this frequency offset is delivered to an NCO (numerically controlled oscillator) oscillator in which the NCO frequency is adjusted by the corresponding correction value. The NCO oscillator has a sine-wave lookup table and a cosine-wave lookup table. The frequency correction is performed by the I/Q time domain samples of the following OFDM symbol being multiplied by the NCO sin/cos values in the multiplier 2. The disturbances caused by VCO frequency transients such as, for example, subcarrier interference (ICI, intercarrier interference) can be countered by this means. During the phase of the VCO with stable frequency, however, the frequency correction should be preferably switched off.

In the text which follows, the structure and the operation of the phase estimator 1 will first be explained in greater detail with reference to FIG. 4. From the Fourier transformer 2, the phase estimator 4 is supplied with complex-valued pilot subcarriers $z_{1,n}, \ldots z_{4,n}$ and are first temporarily stored in a register 10. Similarly, the phase estimator 1 is supplied with four BPSK pilot symbols $a_{1,n}, \ldots, a_{4,n}$ known to the receiver, and are also temporarily stored in a register 11. In a multiplier 12, the pilot subcarriers are multiplied by the pilot symbols.

Since, in the present example, the pilot symbols are only formed by real-valued numbers +1 or −1, the multiplier 12 is simplified into a case-by-case sign changer. The four demodulated pilot subcarriers $\upsilon_{1,n} \ldots \upsilon_{4,n}$ delivered by the multiplier 12 are supplied to a multiplier 13. The complex-value channel coefficients $c_1 \ldots c_4$ obtained by means of a channel estimation by means of Wiener filtering are supplied to a register 14 and then also supplied to the multiplier 13, wherein corresponding conjugate-complex values are generated from the channel coefficients by a conjugate-complex generator 13.1. In a subsequent limiter 13.2, the word width is reduced so that all values which are greater than the reduced word width are cut off ("saturated"). The results of the multiplications are then added together in an accumulator 15 and supply the complex-valued quantity $p_n$. From this, the phase value $\Psi_n$ is determined by means of the CORDIC algorithm in a subsequent CORDIC unit 16 by the relation $\Psi_n = \arg(p_n)$.

Up to this point, the processing is identical in the first and second methods of the phase-value determination according to an embodiment. The following procedure, however, depends on whether the VCO is still unstable or whether it has already reached a stable state. In the present exemplary embodiment, the deciding factor for this is whether the index n for the data symbols has exceeded a preset value M. If it is still below the value M, the phase value $\Psi_n$ initially determined is output as final value and delivered to the phase corrector 4 and the frequency corrector 5. This value does not have a particularly good estimating accuracy and is therefore called noisy phase value. In this stage, however, the speed of the method is of greater importance in order to be able to follow fast VCO frequency transients. If, however, the data symbol n has exceeded the value M, the phase value $\Psi_n$ is supplied to a linear FIR filter 17 which has a variable length. Its registered locations have outputs which can be alternately switched to a common output of the FIR filter 17. This output is connected to a first input of a multiplier 19. The second input of the multiplier 19 is connected to an FIR coefficient table 18. The results of the multiplication are then limited in their word width in a limiter 19.1 and are added together in an accumulator 20. Whereas the multiplications and the summation are given by the equation (5) mentioned above, the FIR coefficients are specified in equation (6) mentioned above. The accumulator 20 then outputs the corrected phase value $\hat{\phi}_n$ to the output.

Switching-over can be performed by two change-over switches 1.1 and 1.2 by means of which the units 17 to 20 can be switched between the output of the CORDIC unit 16 and the output of the phase estimator 1.

Figure 3:
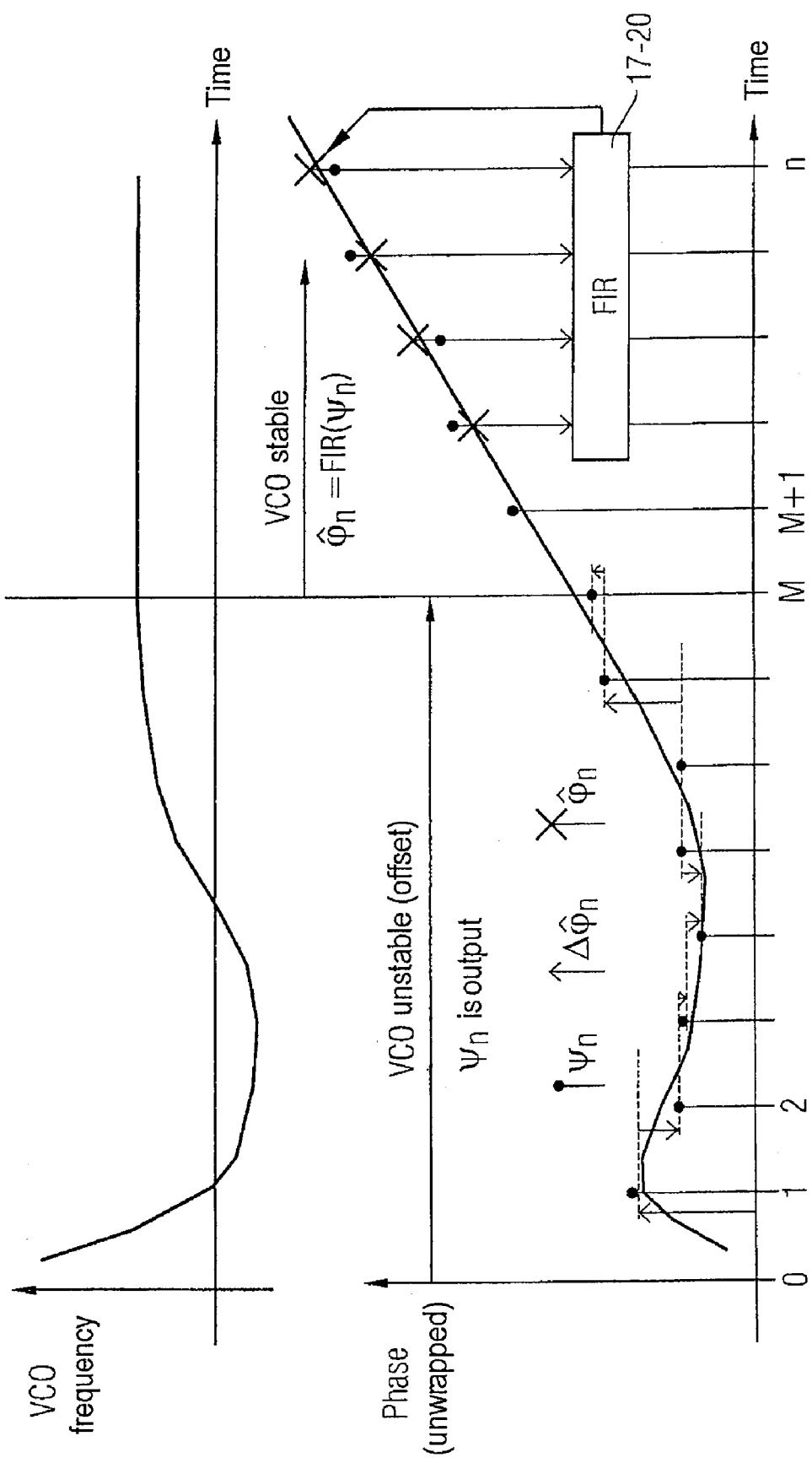
FIG. 3 shows the time response of the local oscillator (top) and the variation with time of the estimated phase values (bottom)
Figure 4:
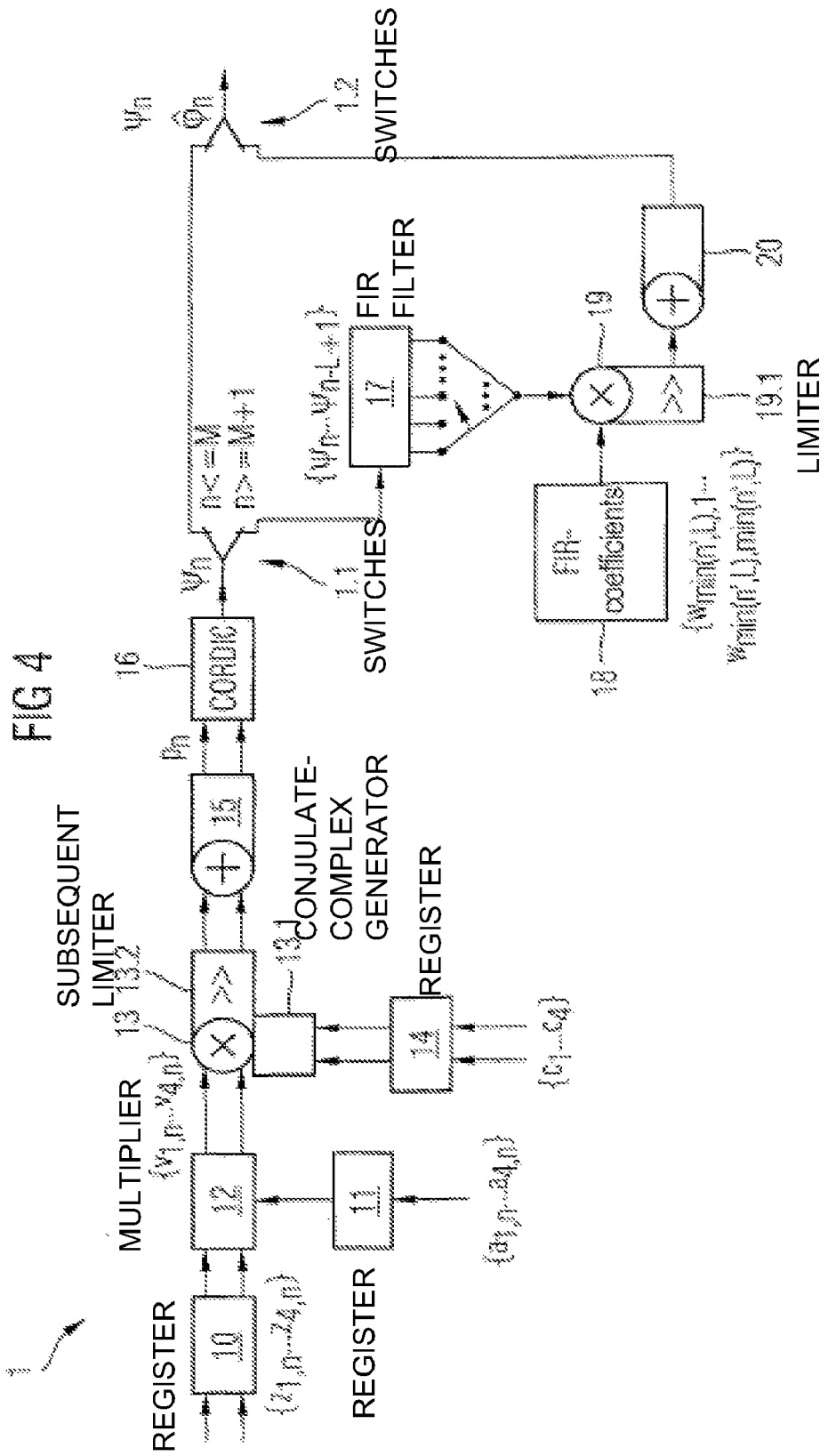
FIG. 4 shows a block diagram representation of an exemplary embodiment of a phase estimator.

FIG. 3 again illustrates the method performed by the phase estimator 1 according to FIG. 4. Whereas the upper part again shows the time-variant VCO frequency, the lower curve shows the corresponding variation of the estimated phase values with time. The phase, which is normally restricted to the area $[-\pi, +\pi)$ is here unwrapped over the area of all real numbers. The phase values $\Psi_n$ estimated in the first section of the first M data symbols are output directly even though they are relatively very noisy. In the second section of a stable VCO frequency, the estimated phase values $\Psi_n$ are supplied to the filter arrangement 17 to 20 whereupon the latter in each case determines and outputs the corrected phase values $\hat{\phi}_n$. The representation shows illustratively how a straight line is placed with best possible approximation through the noisy phase values $\Psi_n$ by means of the filtering and the corrected phase values $\hat{\phi}_n$ come to lie on this straight line.

Figure 5:
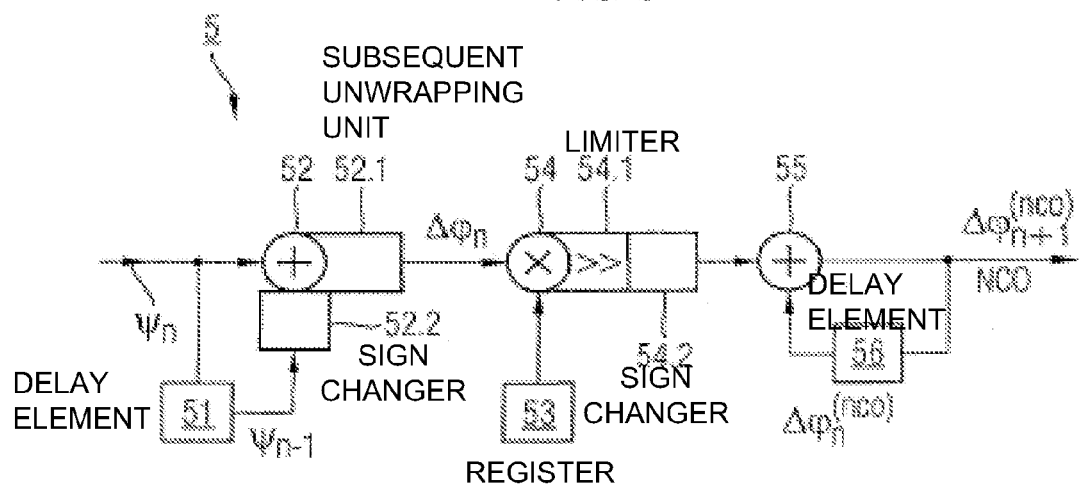
FIG. 5 shows a block diagram representation of an exemplary embodiment of a frequency corrector.

FIG. 5 shows an exemplary embodiment of the frequency corrector 5 which is only active in the first phase so that it is only supplied with noisy phase values $\Psi_n$. As already mentioned, the frequency corrector is switched off in the second phase since it would disturb the linear phase trajectory with a stable VCO. The estimated phase value is supplied to a first input of an adder 52 and, at the same time, to a delay element 51, the output of which is connected to the second input of the adder 52. The sign changer 52.2 provides the delayed phase value $\Psi_{n-1}$ with a negative sign so that a phase difference is formed by the adder 52. The subsequent unwrapping unit 52.1 unwraps the phase, i.e. maps it from [−π, +π] onto the area of all real numbers. The phase difference is then supplied to a multiplier 54 in which a multiplication by the value −1/80 stored in a register 53 is performed. This is followed by a limiter 54.1 for limiting the word width and a sign changer 54.2. The result is supplied to a first input of an adder 55, the second input of which is supplied with the phase difference stored in a delay element 56 and determined in the previous step. As a result, a phase increment $$\Delta\phi_{n+1}^{(nco)} = \Delta\phi_n^{(nco)} - \Delta\hat{\phi}_n/80 \tag{8}$$

is calculated during each 20-MHz period of the NCO and the corrected frequency of the NCO is multiplied by the 80 samples, present in the time domain, of the next OFDM data symbol with this phase increment.

Figure 6:
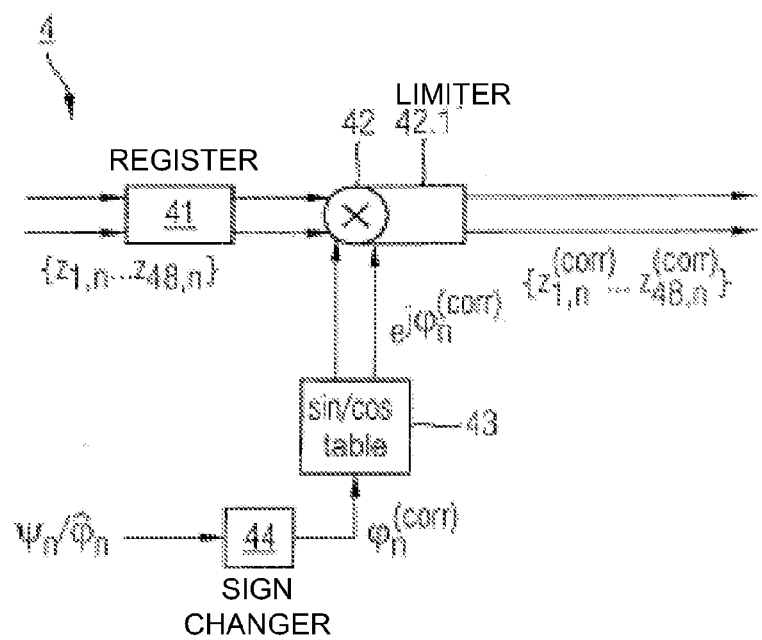
FIG. 6 shows a block diagram representation of an exemplary embodiment of a phase corrector.

FIG. 6 shows a block diagram of the phase corrector 4. This is supplied with the complex-valued subcarrier data values $z_{1,n} \ldots z_{48,n}$, generated in the Fourier transformer, of the 48 data subcarriers. These are first temporarily stored in a register 41 and then supplied to a first input of a multiplier 42. The estimated phase value $\Psi_n$ and corrected phase value $\hat{\phi}_n$ respectively is supplied to a sign changer 44 and the phase value corrected in this way is input into a sin/cos table 43. The complex-valued output of the sin/cos table 43 is supplied to the second input of the multiplier 42. The multiplier 42 is connected to a limiter 42.1 for limiting the word width. At the output of the limiter 42.1, the phase-corrected subcarrier data values are obtained.

What is claimed is:

1. A method for controlling a receiver of a multi-carrier system in response to the frequency characteristic of a local oscillator used for downconverting the received signal, comprising:
    a) estimating and using a common phase value of subcarriers of a received data symbol for correcting the phase of all subcarriers of the data symbol, wherein
    b) with a time-variant frequency of the local oscillator, using a first method for phase estimation and acquisition of the common phase value to be used for the phase correction, wherein the first method operates on the basis of pilot subcarriers, and
    c) with a time-invariant frequency of the local oscillator, using a second method for phase estimation and acquisition of the common phase value to be used for the phase correction, wherein the second method operates on the basis of data subcarriers, wherein for a predetermined period after the local oscillator has been switched on or over, performing b) and then performing c) wherein the predetermined period is predetermined as a number M of data symbols.

2. The method according to claim 1, wherein a) comprises: estimating the common phase value of the pilot subcarriers.

3. The method according to claim 1, wherein in b), using the estimated common phase value of a current data symbol for the phase correction, and in c), determining a corrected common phase value from the estimated common phase values of the current data symbol and using earlier data symbols for the phase correction.

4. The method according to claim 1, further comprising performing a Fourier transform of the received data symbol for determining the subcarriers of the data symbol.

5. The method according to claim 4, wherein after b) has been performed, performing a frequency correction of the next received data symbol before performing the Fourier transform wherein the frequency correction is on the basis of the estimated common phase value.

6. The method according to claim 5, wherein by comparing two successive phase values, the following are performed:
    determining a frequency offset; adjusting the frequency of a numerical controlled oscillator by the frequency offset; and multiplying the I/Q samples of the data symbol by the sin/cos values of the numerically controlled oscillator.

7. A method for controlling a receiver of a multi-carrier system in response to the frequency characteristic of a local oscillator used for downconverting the received signal, comprising:
    a) estimating and using a common phase value of subcarriers of a received data symbol for correcting the phase of all subcarriers of the data symbol, wherein
    b) with a time-variant frequency of the local oscillator, using a first method for phase estimation and acquisition of the common phase value to be used for the phase correction, wherein the estimated common phase value of a current data symbol is used for the phase correction,
    c) with a time-invariant frequency of the local oscillator, using a second method for phase estimation and acquisition of the common phase value to be used for the phase correction, wherein a corrected phase value is determined from the estimated common phase values of the current data symbol and earlier data symbols and is used for the phase correction, and wherein for a predetermined period after the local oscillator has been switched on or over, performing b) and then performing c) wherein the predetermined period is predetermined as a number M of data symbols.

8. The method according to claim 7, wherein a) comprises:
    estimating the common phase value of the pilot subcarriers.

9. The method according to claim 7, wherein performing the common phase value estimation after performing a Fourier transform.

10. The method according to claim 7, wherein after b) has been performed, performing a frequency correction of the next received data symbol before performing a Fourier transform wherein the frequency correction is on the basis of the estimated common phase value.

11. The method according to claim 10, wherein by comparing two successive phase values, the following are performed:
    determining a frequency offset; adjusting the frequency of the numerical controlled oscillator by the frequency offset; and multiplying the I/Q samples of the data symbol by the sin/cos values of the numerically controlled oscillator.

12. The method according to claim 7, wherein
the number M of data symbols is programmable.

13. A device for controlling a receiver of a multi-carrier system in response to the frequency characteristic of a local oscillator used for downconverting the received signal, the device comprising:

a local oscillator for downconverting the received signal, a phase estimator having an input for inputting subcarrier data values and a first output for outputting estimated common phase values, wherein the phase estimator is constructed for estimating an estimated common phase value of subcarriers of a received data symbol in order, with a time-variant frequency of the local oscillator, to use a first method for phase estimation and acquisition of an estimated common phase value to be used for the phase correction which first method operates on the basis of the pilot subcarriers and in order, with a time-invariant frequency of the local oscillator, to use a second method for phase estimation and acquisition of an estimated common phase value to be used for the phase correction which second method operates on the basis of the data subcarriers, wherein the phase estimator is also constructed for using the first method for estimating the estimated common phase value during a predetermined period after the local oscillator has been switched on or over and for using the second method for estimating the estimated common phase value following the predetermined period, the predetermined period is predetermined as a number M of data symbols and a phase corrector having a first input for inputting the subcarrier data values and a second input, connected to the first output of the phase estimator, for inputting the estimated common phase values.

14. The device according to claim 13, further comprising
a Fourier transformer with an input for receiving the downconverted received signal and an output, connected to the input of the phase estimator and the first input of the phase corrector, for transmitting the subcarrier data values.

15. The device according to claim 13, wherein
a second output of the phase estimator is connected to an input of a frequency corrector, wherein the output of the frequency corrector is connected to an input of a numerically controlled oscillator, wherein the output of the numerically controlled oscillator is connected to an input of another frequency corrector.

16. The device according to claim 14, wherein the phase estimator comprises
an FIR filter arrangement with a shift register, the register positions of which can be alternately connected to an output of the shift register; a multiplier, the first input of which is connected to the output of the shift register; an FIR coefficient table, the output of which is connected to the second input of the multiplier; and an accumulator, the input of which is connected to the output of the multiplier, and
a CORDIC unit, wherein
alternatively either the output of the CORDIC unit can be connected directly with an output of the phase estimator, or the output of the CORDIC unit can be connected with an input of the FIR filter arrangement and an output of the FIR filter arrangement can be connected with the output of the phase estimator.

17. The device according to claim 13, wherein the phase corrector comprises a sin/cos table which is supplied with the estimated phase values at its input and which outputs the complex quantity at its output, and a multiplier which is supplied with the subcarrier data values at its first input and the complex quantity at its second input and which outputs phase-corrected subcarrier data values at its output.

18. The device according to claim 13, further comprising
a frequency corrector which has an adding element, the first input of which is connected to the input of the frequency corrector and the second input of which is connected to the input of the frequency corrector via a delay element, and which has a sign changer, and the output of the frequency corrector provides a phase difference, wherein the phase difference is supplied to a numerically controlled oscillator as phase increment.

19. A device for controlling a receiver of a multi-carrier system in response to the frequency characteristic of a local oscillator used for downconverting the received signal, comprising a local oscillator for downconverting the received signal, a phase estimator having an input for inputting subcarrier data values and a first output for outputting estimated common phase values, wherein the phase estimator is constructed for estimating an estimated common phase value of subcarriers of a received data symbol, wherein the phase estimator is constructed in order, with a time-variant frequency of the local oscillator, to use a first method for phase estimation and acquisition of an estimated common phase value to be used for the phase correction, and in order with a time-invariant frequency of the local oscillator, to use a second method for phase estimation and acquisition of an estimated common phase value to be used for the phase correction, and for determining a corrected common phase value from the estimated common phase values of a current data symbol and earlier data symbols, a phase corrector having a first input for inputting the subcarrier data values and a second input, connected to the first output of the phase estimator, for inputting the estimated common phase values, wherein the phase corrector is constructed in order, with a time-variant frequency of the local oscillator, to use the estimated common phase value of the current data symbol for the phase correction, and in order, with a time-invariant frequency of the local oscillator, to use the corrected common phase value for the phase correction, wherein the phase estimator is also constructed for using the first method for estimating the estimated common phase value of the current data symbol during a predetermined period after the local oscillator has been switched on or over and for using the second method for estimating the estimated common phase value following the predetermined period, and wherein the phase corrector is constructed for using the estimated common phase value for the phase correction during the predetermined period and for using the corrected common phase value for the phase correction following the predetermined period, and the predetermined period is predetermined as a number M of data symbols.

20. The device according to claim 19, further comprising a Fourier transformer with an input for receiving the down-converted received signal and an output, connected to the input of the phase estimator and the first input of the phase corrector, for transmitting the subcarrier data values.

21. The device according to claim 19, wherein a second output of the phase estimator is connected to an input of a frequency corrector, wherein the output of the frequency corrector is connected to an input of a numerically controlled oscillator, wherein the output of the numerically controlled oscillator is connected to an input of another frequency corrector.

22. The device according to claim 19, wherein the phase estimator is designed for phase estimation on the basis of the pilot subcarriers and has:
a first multiplier for multiplying the pilot subcarriers by the conjugate-complex pilot symbols, which delivers demodulated pilot subcarriers at its output,
a second multiplier for multiplying the demodulated pilot subcarriers by the conjugate-complex channel coefficients,
an accumulator which is connected to the second multiplier and which accumulates the output values delivered by the second multiplier,
a CORDIC unit which determines the estimated common phase value from the value delivered by the accumulator by means of the CORDIC algorithm.

23. The device according to claim 19, wherein the phase estimator comprises
an FIR filter arrangement with a shift register, the register positions of which can be alternately connected to an output of the shift register; a multiplier, the first input of which is connected to the output of the shift register; an FIR coefficient table, the output of which is connected to the second input of the multiplier; and an accumulator, the input of which is connected to the output of the multiplier, and
a CORDIC unit, wherein
alternatively either the output of the CORDIC unit can be connected directly with an output of the phase estimator, or the output of the CORDIC unit can be connected with an input of the FIR filter arrangement and an output of the FIR filter arrangement can be connected with the output of the phase estimator.

24. The device according to claim 19, wherein the phase corrector comprises
a sin/cos table which is supplied with the estimated phase values at its input and which outputs the complex quantity at its output, and
a multiplier which is supplied with the subcarrier data values at its first input and the complex quantity at its second input and which outputs phase-corrected subcarrier data values at its output.

25. The device according to claim 19, further comprising a frequency corrector which has an adding element, the first input of which is connected to the input of the frequency corrector and the second input of which is connected to the input of the frequency corrector via a delay element, and which has a sign changer, and the output of the frequency corrector provides a phase difference, wherein
the phase difference is supplied to a numerically controlled oscillator as phase increment.

* * * * *